US010703257B2

(12) United States Patent
Fischer et al.

(10) Patent No.: US 10,703,257 B2
(45) Date of Patent: Jul. 7, 2020

(54) METHOD FOR CONTROLLING THE LIGHT DISTRIBUTION OF A HEADLAMP ASSEMBLY, AND HEADLAMP ASSEMBLY

(71) Applicant: HELLA GMBH & CO. KGAA, Lippstadt (DE)

(72) Inventors: Bernd Fischer, Salzkotten (DE); Henrik Hesse, Paderborn (DE); Tobias Irmscher, Lippstadt (DE); Christian Huester, Salzkotten (DE); Stefan Eberhardt, Backnang (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/211,986

(22) Filed: Dec. 6, 2018

(65) Prior Publication Data

US 2019/0106049 A1    Apr. 11, 2019

Related U.S. Application Data

(63) Continuation of application No. PCT/EP2017/063269, filed on Jun. 1, 2017.

(30) Foreign Application Priority Data

Jun. 6, 2016 (DE) .................. 10 2016 110 409

(51) Int. Cl.
*B60Q 1/14* (2006.01)
*F21S 41/141* (2018.01)
*F21S 41/675* (2018.01)
(Continued)

(52) U.S. Cl.
CPC .............. *B60Q 1/143* (2013.01); *F21S 41/14* (2018.01); *F21S 41/141* (2018.01); *F21S 41/16* (2018.01);
(Continued)

(58) Field of Classification Search
CPC .... B60Q 1/085; B60Q 1/1415; B60Q 1/1423; B60Q 1/143; B60Q 1/18
(Continued)

(56) References Cited

U.S. PATENT DOCUMENTS 6,292,752 B1 *    9/2001    Franke .................. G01S 13/867
                                                            701/300
6,443,603 B1      9/2002    Eberhardt
(Continued)

FOREIGN PATENT DOCUMENTS

DE    10 2009 054 101 A1    6/2010
DE    10 2011 081 382 A1    2/2013
(Continued)

OTHER PUBLICATIONS

International Search Report dated Sep. 7, 2017 in corresponding application PCT/EP2017/063269.

*Primary Examiner* — Tung X Le
(74) *Attorney, Agent, or Firm* — Muncy, Geissler, Olds & Lowe, P.C.

(57) ABSTRACT

A method for controlling the light distribution of a headlamp arrangement of a vehicle. Oncoming traffic is detected by an oncoming traffic detector, and an additional light field is subsequently dynamically superimposed by the control unit with the aid of effector in an area of the travel direction lane, in particular in the area of a right lane marking.

20 Claims, 3 Drawing Sheets

(51) Int. Cl.
*F21S 41/14* (2018.01)
*G06K 9/00* (2006.01)
*G06K 9/20* (2006.01)
*F21S 41/16* (2018.01)
*G06T 7/521* (2017.01)

(52) U.S. Cl.
CPC ........ *F21S 41/675* (2018.01); *G06K 9/00805* (2013.01); *G06K 9/2027* (2013.01); *B60Q 2300/322* (2013.01); *B60Q 2300/42* (2013.01); *B60Q 2400/50* (2013.01); *G06T 7/521* (2017.01); *G06T 2207/10028* (2013.01); *G06T 2207/30252* (2013.01)

(58) Field of Classification Search
USPC ...................................... 315/77, 82
See application file for complete search history.

(56) References Cited

U.S. PATENT DOCUMENTS

| | | | |
|---|---|---|---|
| 6,505,947 B1 | 1/2003 | Brinkmann et al. | |
| 9,862,305 B2 | 1/2018 | Nagasawa | |
| 2010/0194888 A1* | 8/2010 | McElroy | B60Q 1/143 348/148 |
| 2012/0062746 A1* | 3/2012 | Otsuka | H04N 7/18 348/148 |
| 2012/0271511 A1* | 10/2012 | Dierks | B60Q 1/143 701/36 |
| 2013/0058116 A1 | 3/2013 | Galbas et al. | |
| 2013/0131922 A1* | 5/2013 | Ogata | B60Q 1/143 701/36 |
| 2017/0113599 A1* | 4/2017 | Park | F21S 41/36 |

FOREIGN PATENT DOCUMENTS

| | | |
|---|---|---|
| DE | 10 2012 025 354 A1 | 7/2014 |
| DE | 10 2013 002 211 A1 | 8/2014 |
| DE | 10 2013 002 320 A1 | 8/2014 |
| DE | 10 2013 222 467 A1 | 5/2015 |
| DE | 10 2015 115 954 A1 | 3/2016 |
| EP | 1093965 A2 | 4/2001 |
| EP | 1093966 A2 | 4/2001 |
| EP | 2329974 A1 | 6/2011 |

* cited by examiner

METHOD FOR CONTROLLING THE LIGHT DISTRIBUTION OF A HEADLAMP ASSEMBLY, AND HEADLAMP ASSEMBLY

This nonprovisional application is a continuation of International Application No. PCT/EP2017/063269, which was filed on Jun. 1, 2017, and which claims priority to German Patent Application No. 10 2016 110 409.4, which was filed in Germany on Jun. 6, 2016, and which are both herein incorporated by reference.

BACKGROUND OF THE INVENTION

Field of the Invention

The present invention relates to a method for controlling the light distribution of a headlamp arrangement of a vehicle. The invention also relates to a headlamp arrangement of a vehicle situated on a travel direction lane, comprising at least one light source, comprising at least one first oncoming traffic detector and comprising a control unit, which sets the light distribution of the at least one light source in such a way that an additional light field may be generated in the area of the travel direction lane for the purpose of directing attention away from light emissions acting upon the driver.

Description of the Background Art

Methods and arrangements of this type are sufficiently well known from the prior art. For example, the European patent specification EP 1 093 966 B1, which corresponds to U.S. Pat. No. 6,443,603, describes a headlamp arrangement and a method for activating a headlamp arrangement of this type, with the aid of which the attention and line of vision of the driver are to be directed away from undesirable light emissions, for example the oncoming light of an approaching vehicle during a passing maneuver. For this purpose, the driver's attention is directed in the direction of his own lane with the aid of an additional light field, which is generated by the headlamp arrangement on the lane edge of the travel direction lane. One great disadvantage of the existing devices and methods for activating devices of this type is that an additional light module having an additional light source, which is able to implement this functionality, must be built into the headlamp for this purpose. To minimize the costs of the additional light module, the generatable light distribution is static. That is, it may be only switched on and off. The position of the additional light distribution on the lane is not variable hereby. In cornering situations, in particular, this results in the fact that the light distribution is no longer projected onto the edge of the lane but is off the lane. The driver, in turn, perceives this as highly distracting, and it results in a reduced acceptance of the function. Moreover, the configuration, i.e. the length, width and geometric shape, of the light distribution is fixed and may not be varied depending on the situation. This fixedly predefined configuration furthermore has the disadvantage that the driver becomes relatively quickly accustomed to the presence of an additional light field of this type, and as a result the desired attention redirection function is continuously weakened.

SUMMARY OF THE INVENTION

It is therefore an object of the present invention to easily and cost-effectively provide a method for controlling the light distribution of a headlamp arrangement and a headlamp arrangement, which avoid(s) the aforementioned disadvantages.

This object is achieved in an exemplary embodiment, in that the oncoming traffic is detected by an oncoming traffic detector, and the additional light field is subsequently dynamically superimposed with the aid of an effector in the area of the travel direction lane, in particular in the area of a right lane marking. Due to this dynamically superimposable additional light field, the fact that an area of the light distribution may be dynamically varied in terms of position, shape and intensity is achievable, on the one hand to be able to always precisely align the area at the edge of the lane, even in cornering situations, and on the other hand to be able, with the aid of superimposed animations, to prevent the driver from becoming accustomed to a statically superimposed additional light field and the desired attention redirection function from diminishing. An intensity and/or a distance and/or position of light emissions of the oncoming traffic may be determined by the oncoming traffic detector. Due to the effector, an additional light field may be generated, which is variable in size, shape, position, contrast, color and/or intensity over time. An additional light field designed as a spotlight element on the travel direction lane, in particular in the area of the right lane marking, may be superimposed, in particular when oncoming traffic is detected, the spotlight element being expanded or enlarged during the encounter with the oncoming traffic. The spotlight element is particularly advantageously expanded or enlarged continuously. The superimposed "first spotlight" of the spotlight element generally catches the attention of the driver, while the dynamic buildup directs the line of vision onto a greater range.

The effector is advantageously activated as a function of the intensity and/or distance and/or position of the light emissions. The intensity and/or the distance and/or the position of the light emissions is/are compared in the comparison unit with a threshold area for each area, and a light distribution of the at least one light source is then set by the control unit upon overshooting the threshold area in such a way that the additional light field is dynamically superimposed in the area of the travel direction lane with the aid of an effector.

The light source can be a high-resolution light source, which can generate a dynamically superimposable additional light field. For this purpose, the light source may include at least one laser arrangement. Alternatively, the light source may include at least one LED matrix light source.

In the case of a light source designed as a laser arrangement, the laser arrangement may be designed as a scanning laser arrangement, whereby to generate the additional light field at least one activatable micromirror can be provided. For this purpose, a 2D micromirror or two individual micromirrors may be provided to implement a redirection of attention in the X and Y directions.

The headlamp arrangement may advantageously comprise at least one DMD chip, on which a number of micromirrors are provided.

The light source may include an LCD screen arrangement.

The oncoming traffic detector may be, for example, a camera, a radar system, a light sensor, a PMD arrangement, a LIDAR arrangement and/or a car-to-x arrangement. A comparison unit may also be advantageously provided, which compares and intensity and/or a distance of detected light emissions with a predefined threshold area.

In all arrangements, the ability to generate a dynamically superimposable additional light field is ensured without any added structural complexity and, in particular, without an additional light module of the particular headlamp arrangement.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
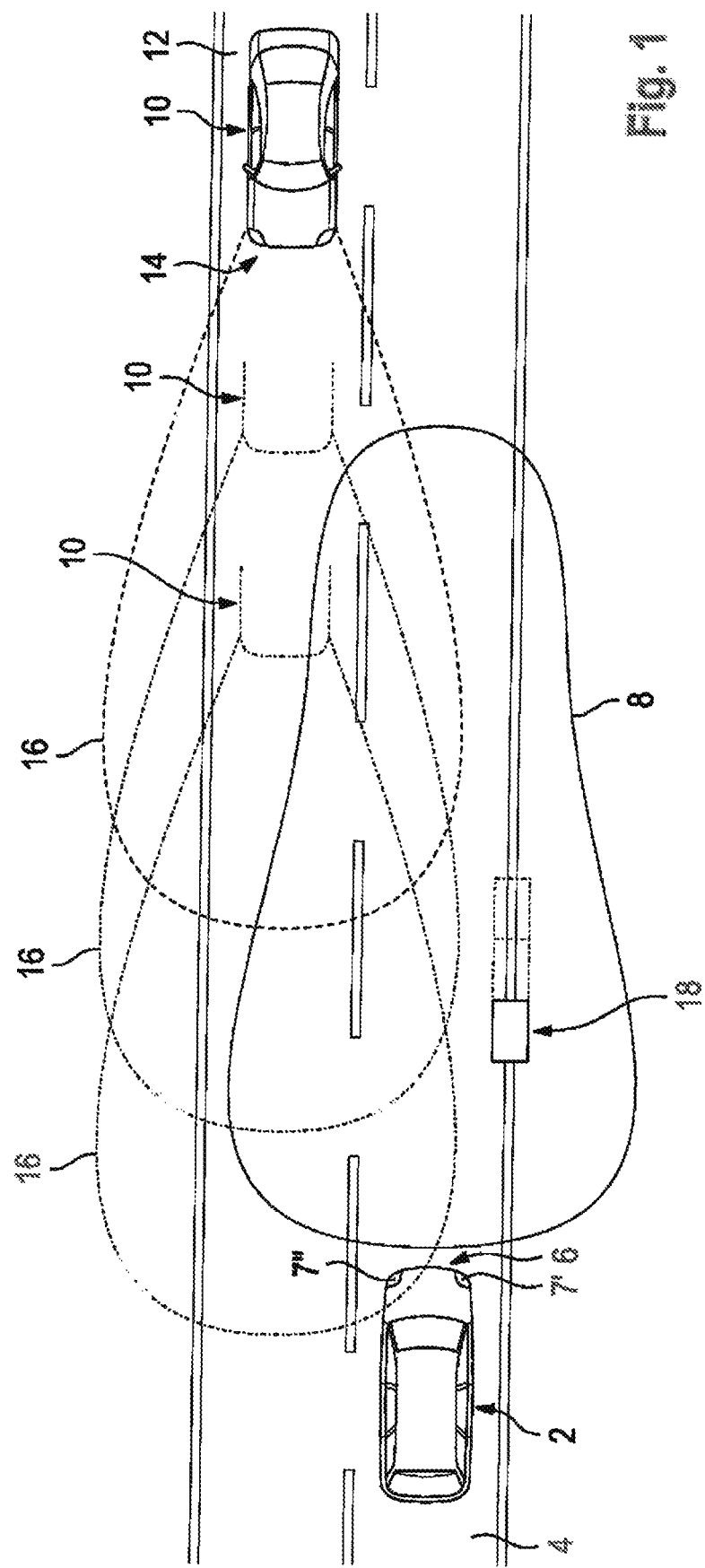
FIG. 1 shows a top view of a vehicle, which includes a switched-on headlamp arrangement, which is being approached by a second vehicle on an oncoming lane.

FIG. 1 shows a top view of a vehicle 2, which is situated on a travel direction lane 4. Vehicle 2 includes a headlamp arrangement 6, whose low beam light, including a light cone 8, is switched on in the present exemplary embodiment. In the present exemplary embodiment, headlamp arrangement 6 comprises two headlamps 7', 7", each of which includes a high-resolution light source, which may be designed as a laser arrangement or as an LED matrix light source.

A second vehicle 10 approaches first vehicle 2 on an oncoming lane 12. With the aid of an adjusted headlamp arrangement 14, second vehicle 10 emits a low beam light distribution 16, which may blind the driver of first vehicle 2. The movement of the two vehicles 2, 10 relative to each other is shown here by a displacement, drawn as the dashed line of vehicle 10 and its light cone 16.

An oncoming traffic detector 20, which, in the present exemplary embodiment, can be designed as a LIDAR arrangement in first vehicle 2, detects the distance between vehicles 2 and 10. In addition, the intensity of light distribution 16 generated by the adjusted headlamp arrangement 14 of vehicle 10 is detected by a sensor built into vehicle 2 in the form of a camera system. The intensity of this light distribution 16 is compared with a threshold area in a comparison unit 22, and the present overshooting of the threshold area due to the light distribution 16 of second vehicle 10 is determined. A control unit 24 then sets the light sources of headlamp arrangement 6 in such a way that they then generate an additional light field 18 on the right lane edge of travel direction lane 4 in the present top view, in particular on the lane marking. Additional light field 18 is designed as a spotlight element, the superimposed "first spotlight" of spotlight element 18 being intended to generally capture the attention of the driver.

Additional light field 18 is then activated via the distance from approaching vehicle 10 determined by a LIDAR system. For this purpose, the approach speed of the approaching vehicle is also detected via the LIDAR system in addition to the distance. The activation results therefrom in such a way that the full configuration of additional light field 18 is reached after a period of, e.g., 2 seconds at a distance of, e.g., 50 meters between vehicle 2 and vehicle 10. The full attention of the driver is achieved thereby. The lane area of travel direction lane 4 is more brightly illuminated, whereby the gaze of the driver of first vehicle 2 is automatically directed away from oncoming lane 12 and onto his own travel direction lane 4. An enlarging rectangle (illustrated by the dashed line) on the right side of the road is projected by high-resolution right headlamp 7. After a holding time of, e.g., 2 seconds (full configuration), the encountered light is faded out again for a period of, e.g., 3 seconds. Alternatively, however, a dynamic switch-off sequence is also conceivable.

With regard to the general use of a possible comparison unit, which compares the intensity of light emissions 16 for an area having a threshold area, and the control unit, which ultimately activates headlamp arrangement 6 in such a way that an additional light field 18 is generated by the light sources, reference is explicitly made to the description in EP 1 093 966 B1, which corresponds to U.S. Pat. No. 6,443,603, which is incorporated herein by reference. In particular, the further developments of the light sources and the sensor systems against the background of this application make the headlamp arrangement 6 according to the invention and the method according to the invention possible even without the use of a comparison unit of this type. A LIDAR arrangement or also a car-to-x arrangement, for example, may thus determine the presence of oncoming traffic and generate an additional light field without comparison with a predetermined threshold area.

Figure 2:
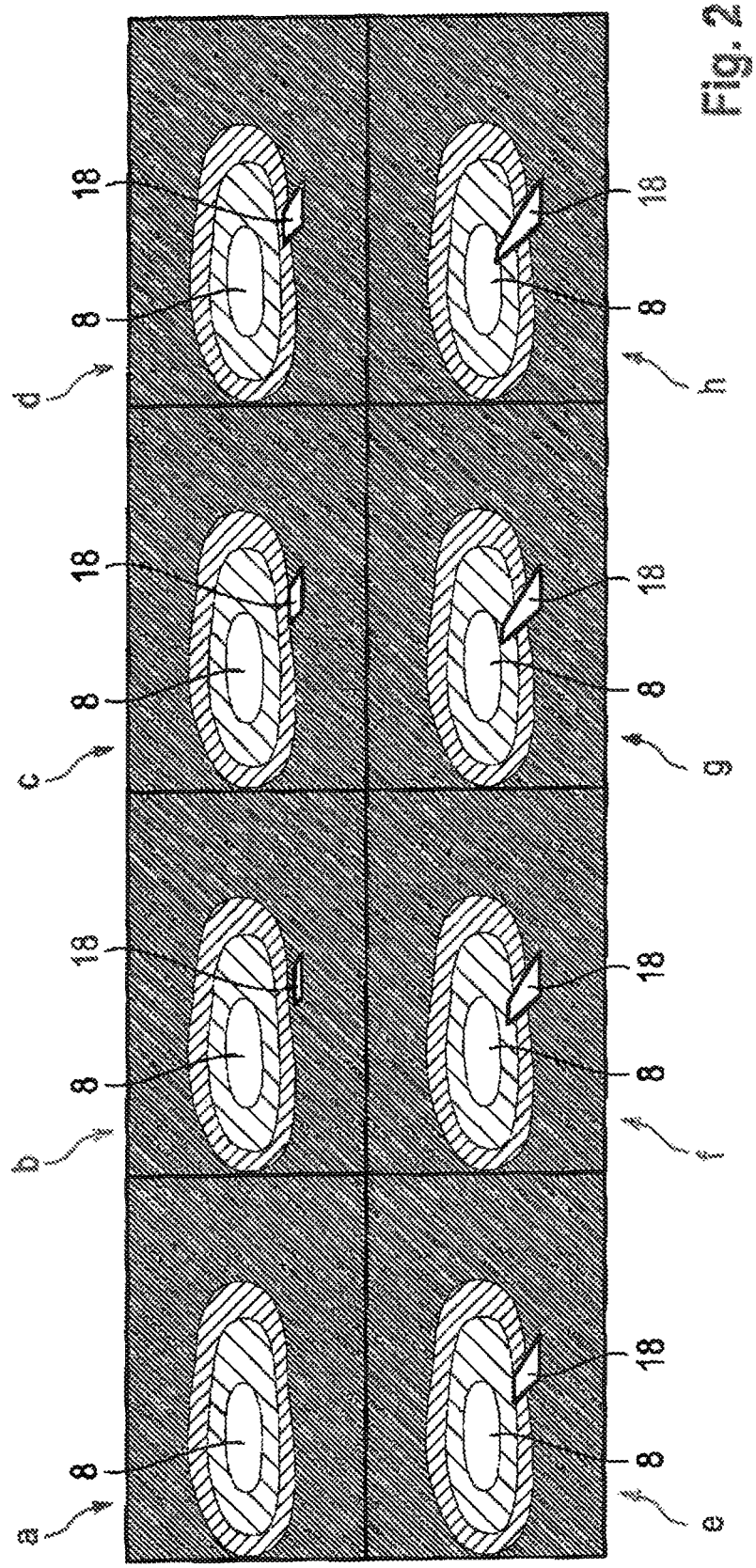
FIG. 2 shows an exemplary embodiment of a dynamically superimposed additional light field.
Figure 3:
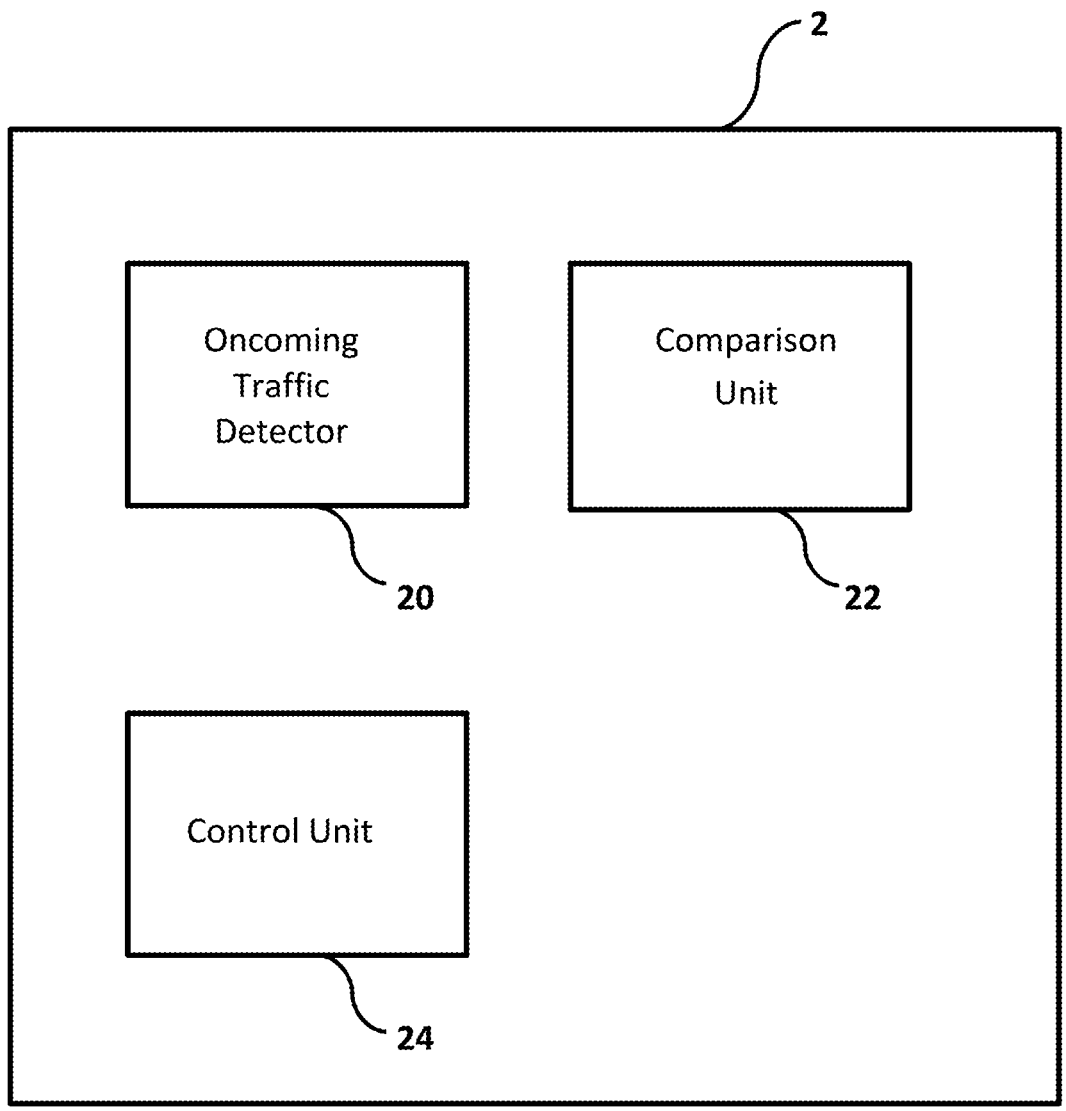
FIG. 3 shows an exemplary black-box diagram of elements within the vehicle.

FIG. 2 shows a dynamic buildup of additional light field 18 in a schematic image sequence a through h. FIG. 2a shows a customary light distribution based on low-beam cone 8 of headlamp arrangement 6. Against the background of light emissions 16, which may divert the attention of the driver of first vehicle 2 away from his line of vision on travel direction lane 4, the light distribution of the light sources is changed by the control unit in such a way that an additional light field 18 is generated, as illustrated in FIG. 2b. This additional light field 18 is subsequently varied with the aid of an effector, such as size, shape, position, contrast and/or intensity, and in the present exemplary embodiment it initially appears as a small rectangle and is then continuously enlarged, as illustrated by FIGS. 2c through 2h. Due to the dynamic variation illustrated here in the size, intensity and thus also the position of additional light field 18, a greater stimulus is exerted upon the driver, compared to the previously known devices, so that his gaze is even more intensively placed on the varying area in the light distribution in the form of additional light field 18.

The specific embodiment illustrated here is only one example of an additional light field variable by an effector. It is also entirely conceivable that this additional light field also varies over time with regard to shape, contrast or color. In one particularly advantageous specific embodiment, the effector may also be used as a function of the intensity of the light emissions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a light distribution provided by at least one light source of a headlamp arrangement of a vehicle, the method comprising:

detecting oncoming traffic by an oncoming traffic detector; and dynamically activating and superimposing an additional light field within a first light field by a control unit via the at least one light source when oncoming traffic is detected, wherein the additional light field is superimposed within the first light field in an area of a travel direction lane or an area of a right lane marking of the travel direction lane, the at least one light source being a high-resolution light source, wherein the first light field and the additional light field are generated by the at least one light source.

2. The method according to claim 1, wherein an intensity and/or a distance and/or a position of light emissions of oncoming traffic is/are determined by the oncoming traffic detector.

3. The method according to claim 2, wherein the additional light field is activated as a function of the intensity and/or the distance and/or the position of the light emissions of the oncoming traffic.

4. The method according to claim 3, wherein the position of the light emissions of the oncoming traffic is compared in the comparison unit with a threshold area of the vehicle, and when the position of the light emissions of the oncoming traffic overshoot the threshold area, a light distribution of the at least one light source is then set by the control unit such that the additional light field is dynamically superimposed in the area of the travel direction lane or the area of the right marking lane of the travel direction lane.

5. The method according to claim 1, wherein, at least one of size, shape, position, contrast, color or intensity of the additional light field varies over time during an encounter of the vehicle with the oncoming traffic.

6. The method according to claim 5, wherein the additional light field is configured as a spotlight element in the area of the travel direction lane or in the area of the right lane marking of the travel direction lane, wherein the spotlight element is superimposed within the first light field when the oncoming traffic is detected, and wherein the spotlight element is expanded or enlarged during the encounter of the vehicle with the oncoming traffic.

7. The method according to claim 6, wherein the spotlight element is expanded or enlarged continuously during the encounter with the oncoming traffic.

8. The method according to claim 1, wherein the additional light field is superimposed only over a portion of the first light field, such that the additional light field is smaller than the first light field.

9. The method according to claim 1, wherein a size of the additional light field increases continuously during an encounter of the vehicle with the oncoming traffic, but remains smaller than the first light field.

10. A headlamp arrangement of a vehicle situated on a travel direction lane, the headlamp arrangement comprising:

at least one light source that provides a first light field in front of the vehicle;

at least one first oncoming traffic detector; and a control unit, which sets a light distribution of the at least one light source such that an additional light field is generated by the at least one light source and superimposed within the first light field when oncoming traffic is detected, the additional light field being provided in an area of the travel direction lane or an area of a right lane marking of the travel direction lane for directing attention away from light emissions of the oncoming traffic acting upon a driver, wherein the at least one light source is a high-resolution light source, which generates the additional light field.

11. The headlamp arrangement according to claim 10, wherein the at least one light source includes at least one laser arrangement.

12. The headlamp arrangement according to claim 11, wherein the at least one laser arrangement is a scanning laser arrangement and comprises an activatable micromirror for generating the additional light.

13. The headlamp arrangement according to claim 11, wherein the at least one oncoming traffic detector is a camera, a radar system, a light sensor, a PMD arrangement, a LIDAR arrangement, or a car-to-x arrangement.

14. The headlamp arrangement according to claim 10, wherein the at least one light source includes at least one LED matrix light source.

15. The headlamp arrangement according to claim 10, wherein the at least one light source may include at least one DMD chip, on which a number of micromirrors are provided.

16. The headlamp arrangement according to claim 10, wherein the at least one light source includes an LCD screen arrangement.

17. The headlamp arrangement according to claim 10, wherein the at least one first oncoming traffic detector detects an intensity and/or a distance and/or a position of light emissions of oncoming traffic and wherein a comparison unit is provided, which compares the position of the light emissions of the oncoming traffic, detected by the at least one first oncoming traffic detector, with a predefined threshold area of a vehicle.

18. The headlamp arrangement according to claim 10, wherein, the control unit sets the light distribution of the at least one light source such that at least one of size, shape, position, contrast, color or intensity of the additional light field varies over time during an encounter of the vehicle with the oncoming traffic.

19. The headlamp arrangement according to claim 10, wherein the additional light field is superimposed only over a portion of the first light field, such that the additional light field is smaller than the first light field.

20. The headlamp arrangement according to claim 10, wherein a size of the additional light field increases continuously during an encounter of the vehicle with the oncoming traffic, but remains smaller than the first light field.

* * * * *